United States Patent
Fornecker

(10) Patent No.: US 9,382,008 B2
(45) Date of Patent: Jul. 5, 2016

(54) ANTI-CRASH SEAT AND AN AIRCRAFT

(71) Applicant: AIRBUS HELICOPTERS, Marignane (FR)

(72) Inventor: Florent Fornecker, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 89 days.

(21) Appl. No.: 14/299,145

(22) Filed: Jun. 9, 2014

(65) Prior Publication Data
US 2014/0361586 A1     Dec. 11, 2014

(30) Foreign Application Priority Data
Jun. 10, 2013 (FR) ...................................... 13 01316

(51) Int. Cl.
*B60N 2/42*     (2006.01)
*B64D 11/06*     (2006.01)

(52) U.S. Cl.
CPC ............ *B64D 11/06* (2013.01); *B64D 11/0619* (2014.12)

(58) Field of Classification Search
CPC ............. B60N 2/4242; B60N 2/42736; B60N 2/42781; B64D 25/04; B64D 11/06
USPC ............... 297/216.17, 216.1; 244/122 R, 141
See application file for complete search history.

(56) References Cited

U.S. PATENT DOCUMENTS

| 3,482,872 A | 12/1969 | Chamberlain | |
|---|---|---|---|
| 4,358,154 A * | 11/1982 | Campbell | B60N 2/4242 188/372 |
| 4,509,621 A | 4/1985 | Desjardins et al. | |
| 5,273,240 A * | 12/1993 | Sharon | B60N 2/4242 188/271 |
| 5,692,705 A * | 12/1997 | Bellais | B64D 11/06 244/122 R |
| 6,394,393 B1 * | 5/2002 | Mort | B64D 11/0619 244/122 R |
| 7,878,312 B2 | 2/2011 | Hiemenz et al. | |
| 8,087,723 B2 * | 1/2012 | Honnorat | B60N 2/4242 244/122 R |
| 8,162,374 B2 * | 4/2012 | Cantor | B60N 2/24 296/65.02 |

(Continued)

FOREIGN PATENT DOCUMENTS

| CN | 102858590 A | 1/2013 |
|---|---|---|
| DE | 102008056661 | 5/2009 |

(Continued)

OTHER PUBLICATIONS

Website http://www.stabilus.com/block-o-lift-with-rigid-locking-vertical-mounting Dated Feb. 3, 2013, Retrieved from the Wayback Machine on Jun. 6, 2014. 3 Pages, "BLOC-O-LIFT with Rigid Locking for Vertical Mounting."

(Continued)

*Primary Examiner* — Laurie K Cranmer
(74) *Attorney, Agent, or Firm* — Brooks Kushman P.C.

(57) ABSTRACT

A seat (5) comprising a bucket (10) and a frame (15) fastened to a floor (2). Said seat (5) includes at least one energy absorber system (20) having a plurality of energy absorbers (21) arranged in parallel. Said seat (5) includes an index (30) that is movable in translation to secure the bucket (10) to an energy absorber system (20) by engaging with one end of one or more energy absorbers (21). Said seat (5) includes at least one suspension system (40) having a spring member (60) suspending said bucket (10) from said frame (15) as a function of the weight of a passenger, mechanical indexing means (60) co-operating with an index (30), said seat (5) including a mechanical inhibitor system (70) for blocking the suspension system (40) during a crash.

16 Claims, 8 Drawing Sheets

(56) References Cited

U.S. PATENT DOCUMENTS

| | | | |
|---|---|---|---|
| 8,342,300 B2 * | 1/2013 | Guillon | B60N 2/24 188/275 |
| 8,408,643 B2 * | 4/2013 | Honnorat | B64D 11/0619 244/122 R |
| 9,061,767 B2 | 6/2015 | Rojas Gallego et al. | |
| 9,109,654 B2 * | 8/2015 | Hiemenz | F16F 9/535 |
| 2003/0201660 A1 * | 10/2003 | Janscha | B60N 2/502 297/216.17 |
| 2007/0051850 A1 * | 3/2007 | Peck | B64D 25/04 244/122 R |
| 2008/0156602 A1 * | 7/2008 | Hiemenz | B60N 2/4242 188/267.1 |
| 2009/0267390 A1 | 10/2009 | Honnorat et al. | |
| 2011/0204685 A1 * | 8/2011 | Dock | B64D 11/0619 297/216.1 |
| 2012/0273649 A1 * | 11/2012 | Mindel | B60N 2/24 248/636 |

FOREIGN PATENT DOCUMENTS

| | | |
|---|---|---|
| EP | 2133457 | 12/2009 |
| FR | 2923568 | 5/2009 |

OTHER PUBLICATIONS

French Search Report for FR 1301316, Completed by the French Patent Office on Feb. 6, 2014, 6 Pages.

Chinese First Office Action Dated Jan. 7, 2016, Application No. 201410250617.9, Applicant Airbus Helicopters, 5 Pages.

Korean Notice of Preliminary Rejection Dated Dec. 3, 2015, Application No. 2014-0069595, Applicant Airbus Helicopters, 3 Pages.

\* cited by examiner

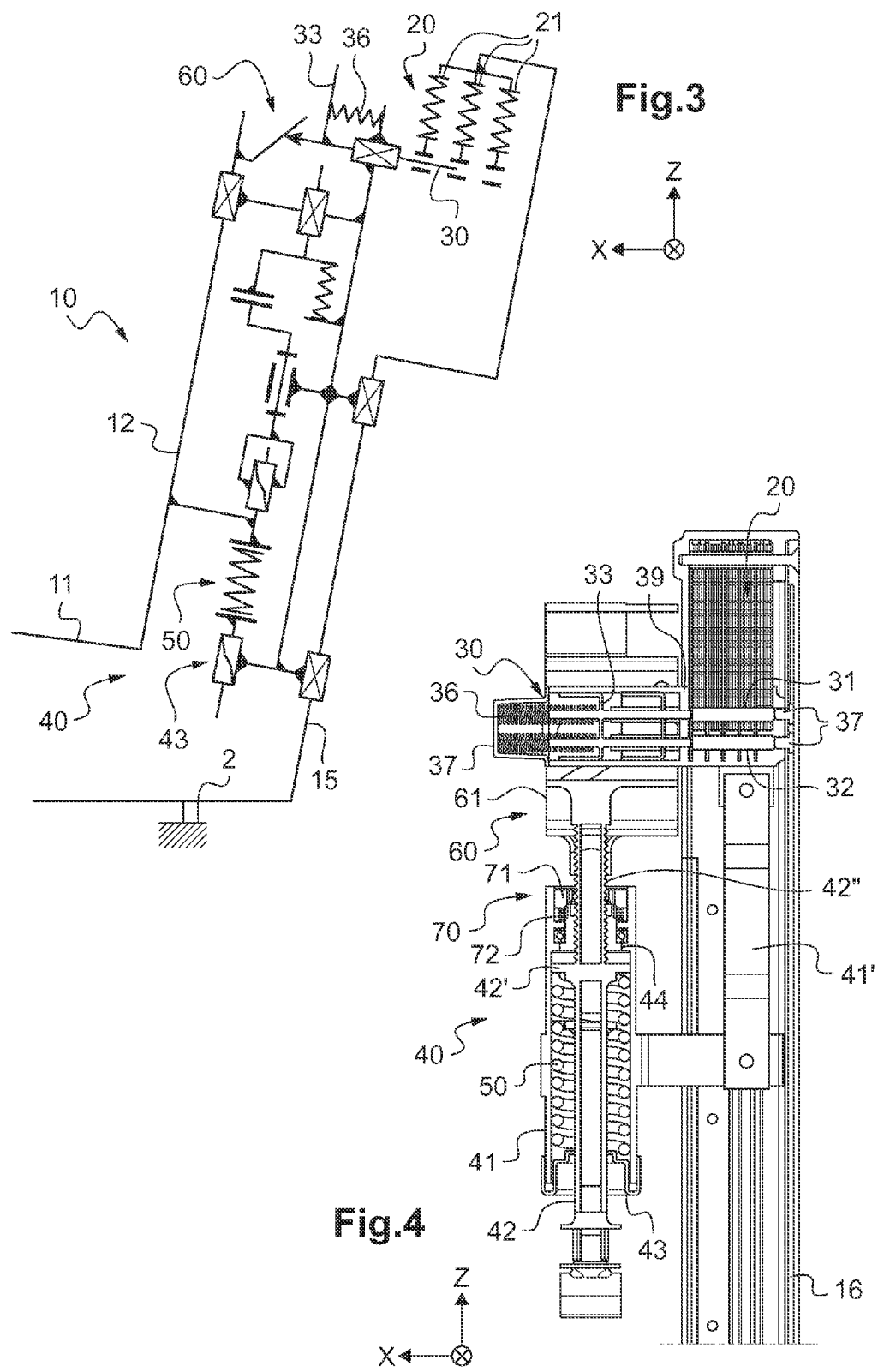

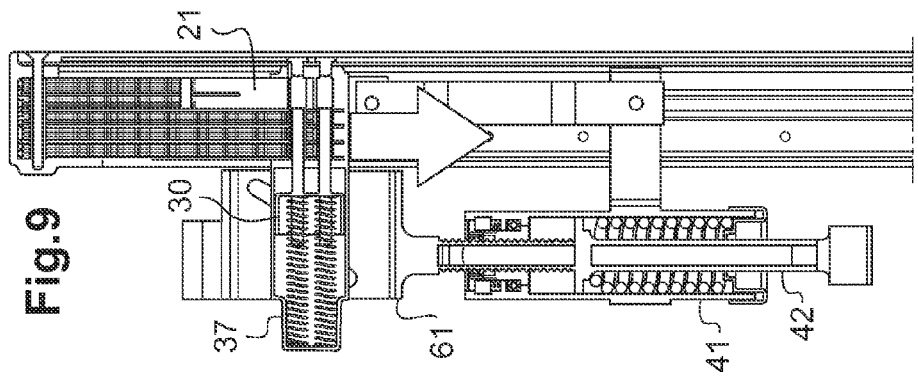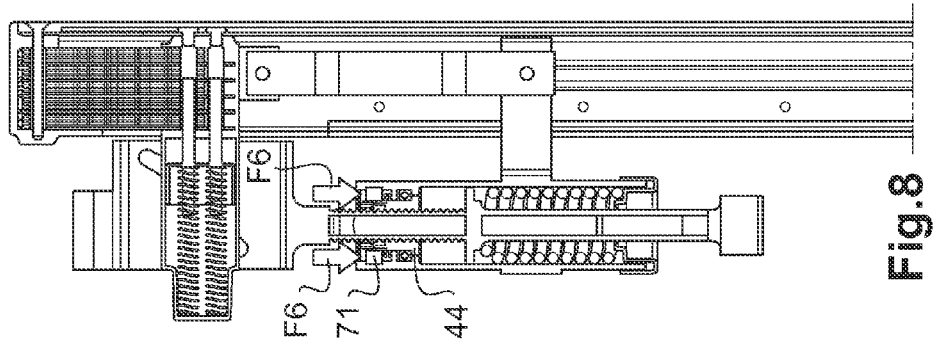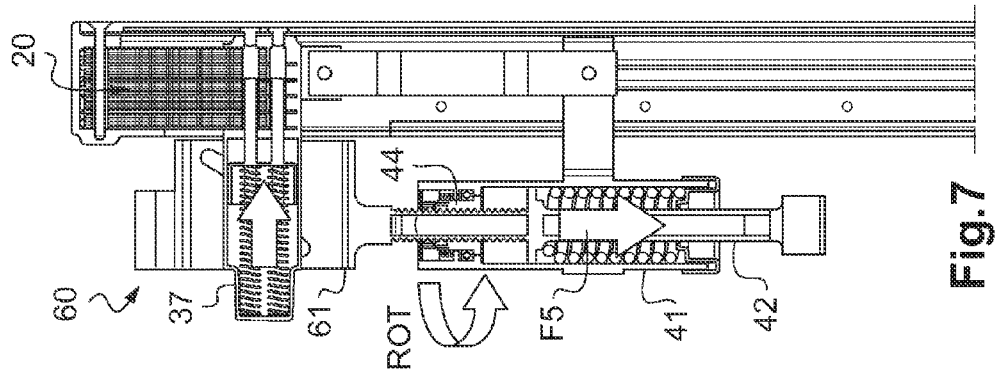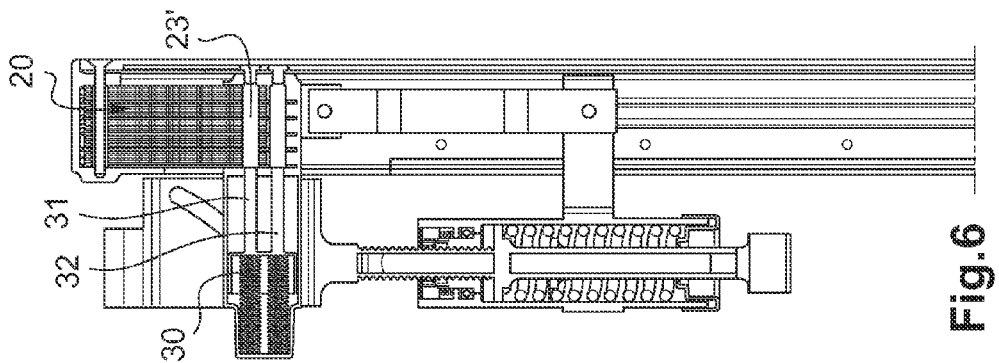

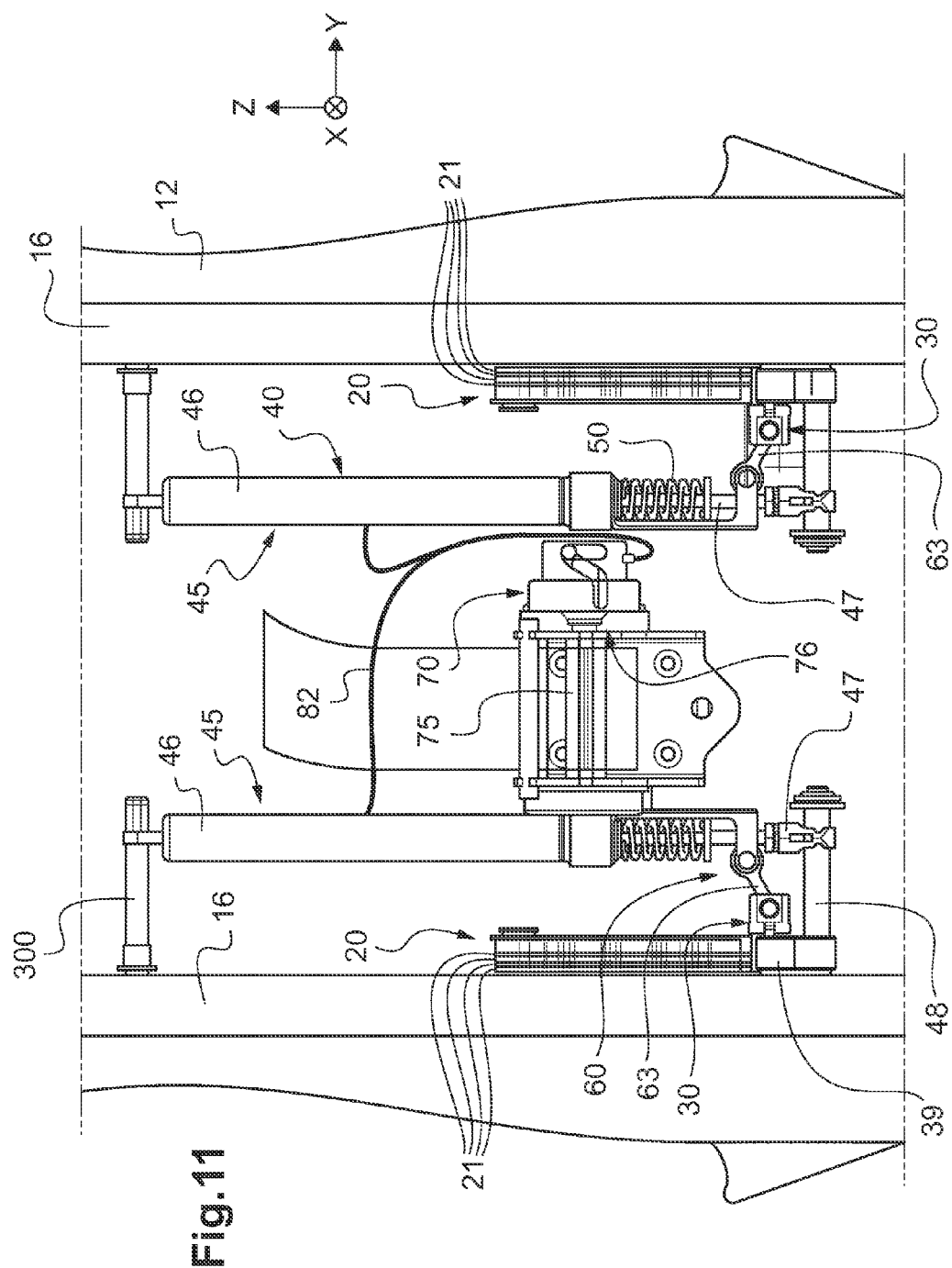

ANTI-CRASH SEAT AND AN AIRCRAFT

CROSS REFERENCE TO RELATED APPLICATION

This application claims priority to French patent application No. FR 13 01316 filed on Jun. 10, 2013, the disclosure of which is incorporated in its entirety by reference herein.

BACKGROUND OF THE INVENTION (1) Field of the Invention

The present invention relates to an anti-crash seat and in particular a seat for a vehicle such as an aircraft. The seat incorporates means for protecting passengers in the event of violent impacts and/or a sudden change in the speed of the aircraft, in particular in the event of a crash.

(2) Description of Related Art

In a common embodiment, the seat associates a frame and a seat bucket that is made up of a seat proper with a seatback extending upwards therefrom. The frame is anchored to a floor of the aircraft via bottom brackets and it includes upright legs extending in elevation that are secured to the brackets and that together carry the bucket.

The term "bucket" is used to mean an assembly on which one or more passengers can sit. The bucket may thus be a bench suitable for receiving a plurality of passengers. In addition, the term "passenger" is used to designate any individual on board the aircraft, and thus applies equally to a pilot and to a person being transported.

Seats for aircraft also incorporate energy absorber means for protecting passengers sitting on such seats in the event of a crash.

For example, Document US 2009/0267390 proposes arranging at least one energy absorber element that is fastened to the bucket and to the frame. In the event of a crash, the bucket moves relative to the frame and thus deforms the absorber element. Deformation of the absorber element tends to dissipate at least a portion of the energy resulting from the crash.

The energy absorber means thus serve in particular to reduce the forces exerted on the lumbar vertebrae of a passenger in the event of a crash.

Certain civilian and military standards specify a weight population range for which a crash should be survivable, e.g. a range extending from a passenger weighing 46.5 kilograms (kg) to a passenger weighing 96 kg. The ability of the bone structure of a passenger to withstand an intense compression force, e.g. resulting from a sudden deceleration, varies significantly over this population range.

This range can make it difficult to determine the dimensions of the energy absorber means.

For example, if the energy absorber means are dimensioned for a passenger of light weight, then a passenger of heavy weight runs the risk of being injured because the energy absorber means may come into abutment or break as a result of a crash. On the contrary, if the energy absorber means are dimensioned for a heavy passenger, then the absorber will be overdimensioned for a light passenger, and the energy resulting from the deceleration to which a light passenger is subjected runs the risk of not being well dissipated.

Under such circumstances, seats are provided with hydraulic, electronic, or manual systems for adapting them to the weight of the passenger.

Document FR 2 923 568 describes an energy absorber device including automatic and independent setting means that incorporate a hydraulic fluid throttling mechanism for controlling the flow of said fluid between a high pressure chamber and a low pressure chamber. The pressure that exists in the high pressure chamber is associated with the extent to which the hydraulic fluid is compressed by a load support moving. By way of example, the support may constitute a bucket and the load may represent one or more passengers.

Although effective, hydraulic systems can give rise to problems of leakage, in particular because of the variations in pressure and temperature that are to be observed onboard an aircraft during a flight.

Document US 2008/0156602 presents an electronic system including a controller that controls an energy absorber as a function of information coming from sensors.

The operation of an electronic system can turn out to be erratic during a crash, which by its very nature is destructive.

Document U.S. Pat. No. 4,509,621 describes a system that is manually adjustable. Likewise document U.S. Pat. No. 4,358,154 provides an energy absorber system that can be adjusted using a knob.

Certain known seats are thus fitted with manual adjustment systems in order to adapt the energy absorber means to the weight of a passenger, for example. Those systems require human intervention which might be forgotten or which might lead to a wrong adjustment. Those systems are also often heavy, bulky, and expensive.

Furthermore, on a rotorcraft, and in particular a helicopter, a seat is heavily stressed in terms of vibration. Under such circumstances, the seat proper of the seat is generally covered in a lining of foam for limiting vibratory stress.

Thus, the seat has both crash energy absorber means and antivibration means, i.e. foam. It can be understood that throughout the present description, the term "energy absorber means" is used to designate means suitable for absorbing the energy that results from a large acceleration or deceleration during a crash, specifically for the purpose of protecting the lumbar vertebrae of an individual, and the term "antivibration means" is used to designate means for avoiding transmitting vibration from the vehicle to said individual in order to improve comfort.

Although effective, if the antivibration means are stressed little by the weight of a passenger, the crash energy absorber means are activated only after the residual stroke of the vibration of the absorber means has been used up. In other words, at the instant of a crash, the individual moves by stressing the antivibration means, i.e. by flattening the foam. The individual is therefore subjected to an increase in speed before stressing the crash energy absorber means. During a crash, the movement in translation of the individual is stopped suddenly. This leads to a force peak on the lumbar vertebrae at the moment when the crash energy absorber means are stressed. In compliance with certification requirements and in particular with the regulation known by the name "FAR part 29" that is applicable to rotorcraft, the force peak is acceptable so long as it remains below a maximum peak.

Manufacturers thus take this maximum peak into consideration when dimensioning the foam, for example.

Document US 2011/0204685 proposes using an inhibitor system for inhibiting antivibration means at the moment of a crash.

Furthermore, Document U.S. Pat. No. 5,692,705 describes a bench carried by vertical supports with at least one energy absorber being arranged between the bench and a vertical support.

The aircraft also includes at least one additional absorber that can be coupled to the bench with the help of a coupling mechanism under the control of a harness.

Document U.S. Pat. No. 3,482,872 does not lie in the technical field of the invention. That document describes means for attaching a safety belt while allowing for manual adjustment.

BRIEF SUMMARY OF THE INVENTION

An object of the present invention is thus to propose a vehicle seat suitable for providing an antivibration function and an anti-crash function without leading to force peaks on the lumbar vertebrae or at least while generating a force peak on the lumbar vertebrae that is well controlled, the seat also being optimized in terms of its own compactness and weight.

According to the invention, a vehicle seat comprises a bucket and a frame fastened to a floor for carrying the bucket, the bucket optionally being provided with a seat proper and a seatback for receiving a passenger, the seat including at least one energy absorber system.

The seat is remarkable in particular in that each energy absorber system is provided with a plurality of energy absorbers arranged in parallel, each energy absorber having a first end secured to the frame.

The energy absorbers may be of known type. For example, each absorber may comprise an elongate member extending in elevation from a first end held stationary against the frame to a second end that is movable in the event of a crash.

Furthermore, the seat includes an index that is movable in translation to secure the bucket to an energy absorber system by engaging a second end of one or more energy absorbers of the system.

Under such circumstances, the seat includes at least one suspension system having a spring member suspending the bucket from the frame as a function of the weight of a passenger, at least one suspension system including mechanical indexing means co-operating with an index so that a movement in translation in elevation of the suspension system relative to the frame under the action of the weight of at least one passenger sitting on the bucket automatically causes a transverse movement in translation of the index in order to engage the number of energy absorbers that corresponds to the weight, said seat including a mechanical inhibitor system for blocking the suspension system in the event of a crash.

Thus, when a passenger sits on the bucket, the bucket moves in elevation relative to the frame, compressing or stretching the spring member. Such a spring member may comprise at least one spring or possibly a block of elastic material such as an elastomer material, for example. The bucket then moves towards the floor.

The suspension system adjusts the amplitude of the movement as a function of the weight of the load carried by the bucket.

Thus, at least one member of the suspension system moves in translation together with the bucket in an elevation direction.

Furthermore, the indexing means of the suspension system move the index relative to the absorber system in translation in a transverse direction so that the index is secured to the required number of energy absorbers.

By way of example, the index is moved mechanically so as to be secured to six energy absorbers when supporting a load of 60 kg. However, for a load of 80 kg, the index is moved mechanically to be secured to eight energy absorbers.

When unloaded, the index may be secured either to all of the absorbers, or to only one absorber, or indeed to no absorber, depending on the variant.

The seat thus includes a simple mechanical device enabling the energy absorber system to be matched to the weight supported by the seat, and making use of an index that selects the required number of energy absorbers automatically and mechanically.

Prior to a crash, the inhibitor system blocks the spring member. This step may take place when the passenger sits on the seat or else prior to the aircraft impacting on the ground, depending on the variant.

At the moment of a crash, the bucket moves downwards in translation. Since the spring member is inhibited, the suspension system moves together with the bucket and the index. The index then stresses the energy absorber system by pulling on the absorbers that have previously been selected by the index.

Furthermore, the seat may include one or more of the following characteristics.

Thus, at least one energy absorber system may include at least one fusible member secured to the frame and capable of being secured to an index.

Consequently, the energy absorber system is stressed after the fusible member(s) has/have broken. The fusible members serve to avoid unwanted use of the energy absorber system in the event of a hard landing.

In a first variant, the index may comprise at least one cylinder penetrating into respective orifices of the absorbers, or in an orifice of a fusible member, where appropriate. The index thus presents a finger that can penetrate into the ends of the energy absorbers that are fastened to the frame.

In a second variant, the index may comprise a hollow cylinder sliding around respective ends of said absorbers.

In other words, the index has a finger passing through one of the ends of the respective energy absorbers in the first variant, and a cylinder surrounding said ends in part in the second variant.

Furthermore, the seat may include guide means for guiding at least one index to move in translation.

Each index may thus be associated with respective guide means.

By way of example, the seat may include a sheath in which a head of the index is slidably mounted, at least one spring being interposed between said head and said sheath. The sheath serves to guide the index. Furthermore, the spring tends to place the index in its initial reference position, i.e. the position reached in the absence of a load being carried by the seat.

In the event of a crash, the absorber system is stressed by the index. In order to avoid deformation of the index degrading performance, the index may comprise a plurality of fingers engaged in or around the absorber system, depending on the variant.

For example, each index comprises a first finger co-operating with the absorbers of an energy absorber system and a second finger co-operating with a fusible member of the energy absorber system, where appropriate.

In one version, the indexing means comprise a hollow casing provided with a slot presenting an inclined slope, the index having a stud slidable in the slot so that movement in translation in elevation of the suspension system causes the stud to slide along the slot, causing the index to move transversely in translation.

The movement in translation in elevation of suspension means causes the casing to move. This causes the linear or curved inclined slope to move relative to the stud of the index. Under such circumstances, the stud moves transversely in order to adapt to the new position of the casing.

In a second version, the indexing means comprise a link hinged to said index and to a movable body of the suspension means. A movement of the movable body together with the bucket causes the index to move.

These two versions thus propose simple mechanical systems for automatically positioning the index, and thus for selecting the number of energy absorbers to be used as a function of the weight of the passengers sitting on the seat.

In a first alternative, the suspension system may comprise an actuator having a movable body and a stationary body, the movable body being secured to the bucket and the stationary body being attached to the energy absorber system, the spring member being interposed between the movable body and the stationary body.

The term "movable" body designates the portion of the actuator that is connected to the bucket, and the term "stationary" body designates the portion of the actuator connected to the energy absorber system. Other than in the event of a crash, the energy absorber system does not have any movable portion.

The actuator may be an actuator of known type, such as the actuator described at the following Internet address:
"http://www.stabilus.com/block-o-lift-with-rigid-locking-vertical-mounting".

The suspension system may also use an actuator type guide system while being suitable for being locked on command.

The spring member may be interposed between a shoulder of the stationary body and the movable body, for example.

In an embodiment, the stationary body comprises a rod of the actuator secured to a return rod carrying means for guiding an index.

Under such circumstances, the inhibitor system may be provided with a harness winder and a control cable for the actuator, a cam being interposed between said winder and said cable so that rotation of the winder causes the cable to move in translation and inhibit the actuator.

The inhibitor system is then engaged when a passenger puts on a safety harness, and is thus engaged in particular in the event of a crash.

For example, the cable is fastened to a rocker lever exerting a force on a switch of the actuator.

In a second alternative, the suspension system comprises a cylindrical body attached to the energy absorber system and a rod secured to the bucket and projecting from said cylindrical body, together with a spring member, the spring member being interposed between a stop of the cylindrical body and a shoulder of the rod.

The rod may also include a threaded portion. The suspension system includes a nut arranged in said cylindrical body and engaged on said threaded portion.

When a passenger sits on the seat, the rod moves together with the bucket and stresses the spring member. In parallel, the nut turns around the threaded portion to produce damping.

The inhibitor system may then be provided with a blocking ring arranged in the cylindrical body vertically in register with the nut, the cylindrical body including movement prevention means for preventing the blocking ring from moving in rotation about an axis of rotation of the nut, the blocking ring having an inside surface provided with first splines extending in elevation and the nut having an outside surface provided with second splines extending in elevation, a spring being interposed between an internal shoulder of the cylindrical body and the blocking ring to separate the first and second splines other than during crash conditions, and to allow the first splines to engage with the second splines during a crash.

Consequently, other than in crash situations, the blocking ring is pushed back above the nut by a spring. In contrast, in the event of a crash, the blocking ring is subjected to forces that move it towards the nut. The blocking ring then prevents the nut from moving in rotation and thus freezes the position of the rod relative to the cylindrical body.

Furthermore, the frame may comprise first and second legs, with one energy absorber system per leg, one movable index per leg, and one suspension system per leg.

Finally, the invention provides an aircraft having a seat of the above-described type.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 3 to 10 are views explaining an embodiment of the invention combining a first variant of an index, a first version of indexing means, and a first alternative embodiment of a suspension system; and FIGS. 11 to 16 are views explaining an embodiment of the invention combining a second variant of an index, a second version of indexing means, and a second alternative embodiment of a suspension system.

Elements that are present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Y.

Figure 1:
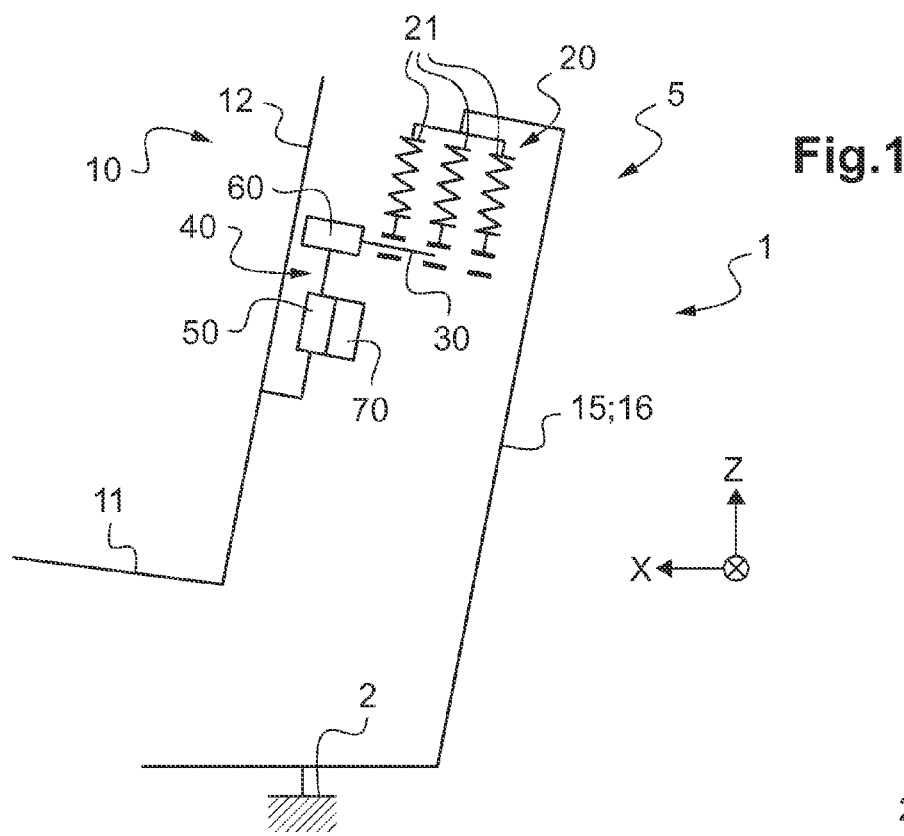
FIG. 1 is a diagrammatic view showing the various functional means of the invention.

FIG. 1 shows an aircraft 1 having a seat 5 that is fastened to a floor 2. The other members of the aircraft are not shown in order to avoid pointlessly overloading FIG. 1.

The seat 5 possesses a bucket 10 conventionally provided with a seat proper 11 and a seatback 12. The seat is also provided with a frame 15 fastened to the floor 2 in order to carry the bucket 10. The frame 15 may have one or more legs 16 extending in elevation from the floor 2.

The bucket 10 is suspended from the frame 15 by a fastener system designed to absorb the energy that results from a crash.

The fastener system comprises at least one energy absorber system 20. Each energy absorber system 20 is provided with a plurality of absorbers 21 arranged in parallel.

Figure 2:
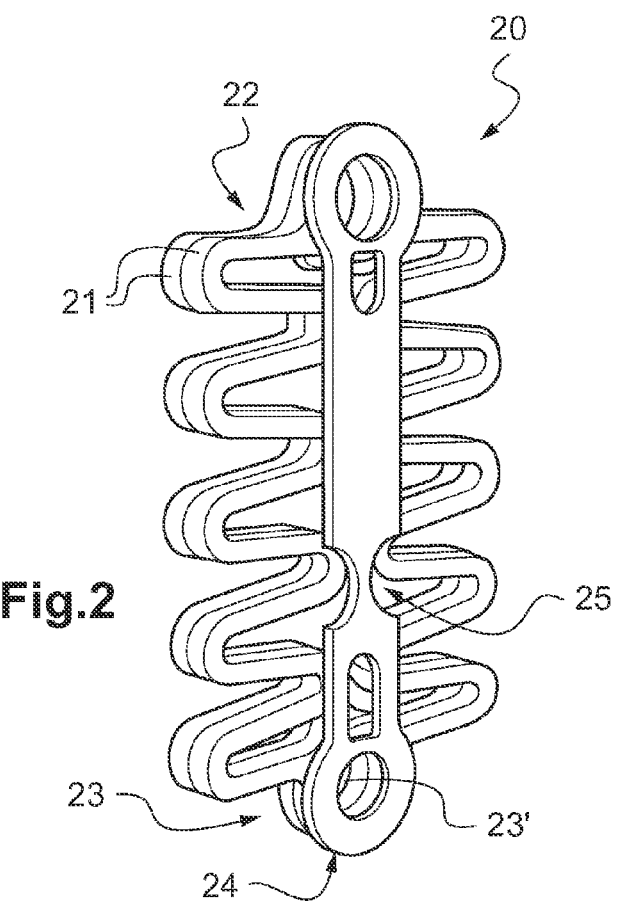
FIG. 2 is a view of an energy absorber system.

With reference to FIG. 2, each absorber 21 extends in elevation from a first end 22 to a second end 23. The first end and/or the second end may include orifices for fastening to a mechanical element, or indeed they may be solid for inserting in a mechanical element. Between the first end and the second end, an absorber may also include a plastically deformable zone, where plastic deformation of the absorber serves to absorb a portion of the energy giving rise to that deformation. Reference may be made to the state of the art concerning such absorbers.

In addition, the energy absorber system may have one or more fusible members 24. Such a fusible member may comprise a blade having a constriction 25 dimensioned to break under predetermined conditions. The blade may extend between two ends, possibly facing the ends of the absorbers.

It can be understood that the invention makes it possible to use any type of energy absorber, in particular those that are stressed in traction.

Under such circumstances, and with reference to FIG. 1, each absorber is fastened via its first end 22 to the frame 15. The absorbers are thus suspended from the frame 15.

Furthermore, the fastener system includes a suspension system 40 that is interposed between the energy absorber system 20 and the bucket 10. The suspension system 40 is then fastened firstly to the bucket 10, e.g. to a seatback 12, and secondly to the energy absorber system 20. For example, the suspension system is fastened to at least one fusible member and/or to at least one absorber.

The suspension system is provided with a spring member 50 suspending the bucket 10 from the frame 15 via the energy absorber system 20 as a function of the weight of the passenger. The spring member 50 thus adjusts the position of the bucket 10 relative to the frame 15 and to the floor as a function of the weight of the individual(s) sitting on the seat.

The seat 5 also has an inhibitor system 70 for blocking the suspension system 40 during a crash. During a crash, the movements of the seat are thus transmitted directly to the energy absorber system.

For this purpose, the suspension system 40 is fitted with mechanical indexing means 60 engaged with an index 30. The index 30 slides transversely relative to the energy absorber system 20 in order to engage with at least one absorber 21, the number of absorbers fastened to the index depending on the position of the bucket relative to the frame.

The function of the indexing means is to impart movement in translation automatically to the index 30 in order to engage the number of energy absorbers 21 that corresponds to the weight of the individuals sitting on the seat as a function of the movement in translation performed by the suspension system 40 relative to the frame 15 as a result of the weight of those individuals.

When the frame 15 has first and second legs 16, the seat may possess one energy absorber system 20 together with one index 30 and one suspension system 40 per leg 16.

FIGS. 3 to 10 show an embodiment of the invention combining a first variant of an index, a first version of indexing means, and a first alternative embodiment of a suspension system.

With reference to FIGS. 3 and 4, a first variant of an index comprises at least one cylindrical finger 31, 32 capable of passing through the second ends of the absorbers and the fusible members. For example, the index comprises at least a first finger 31 for passing through orifices in the second ends of the absorbers, and at least a second finger 32 for passing through the fusible members.

An index having a plurality of fingers presents the advantage of having a plurality of force takeup points with the absorbers, thereby optimizing the distribution of the loads exerted on the index. For example, an index having a plurality of fingers engaging in the absorbers can limit any risk of excessive bending of the index.

The fusible members may also be used for this purpose, in particular if it is necessary also to adapt the maximum acceptable load before triggering the energy absorber system, e.g. when a bench is associated with a range of acceptable weights that is greater than for an individual seat. With an individual seat, a single fusible member may suffice.

The index also has a head 33 that is slidable in a sheath 37. The sheath 37 thus constitutes guide means 39 for guiding transverse movement in translation of the index.

In addition, at least one spring may be interposed between the sheath and the index, and more precisely between the sheath and the head 33 of the index in the example shown. This spring seeks to position the index in a determined position when there is no weight on the bucket.

For example, the index is not engaged in any absorber in this position. In contrast, the sheath may be provided with engagement means 37' engaging with at least one fusible member and/or at least one absorber independently of the weight supported by the seat so that the indexing system including the index and its guide is always connected to the energy absorber system 20.

Furthermore, it may be observed in FIG. 4 that the energy absorber system may be housed in a leg 16 of the frame.

Furthermore, the suspension system comprises a "stationary" assembly that is connected to the energy absorber system and also a "movable" assembly that is connected to the bucket 10.

The movable assembly may thus include a first version of indexing means 60.

Figure 5:
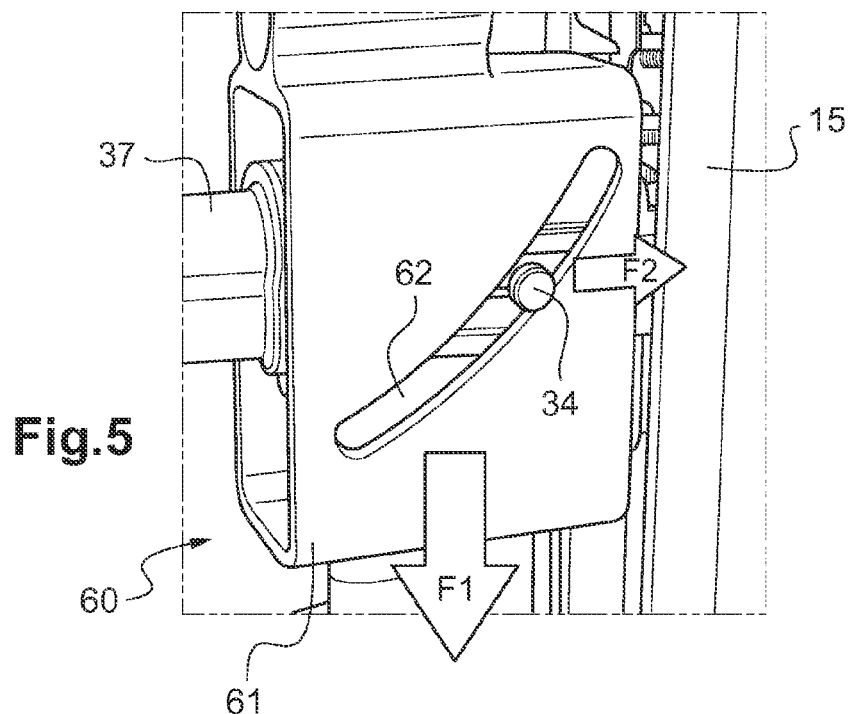
Figure 10:
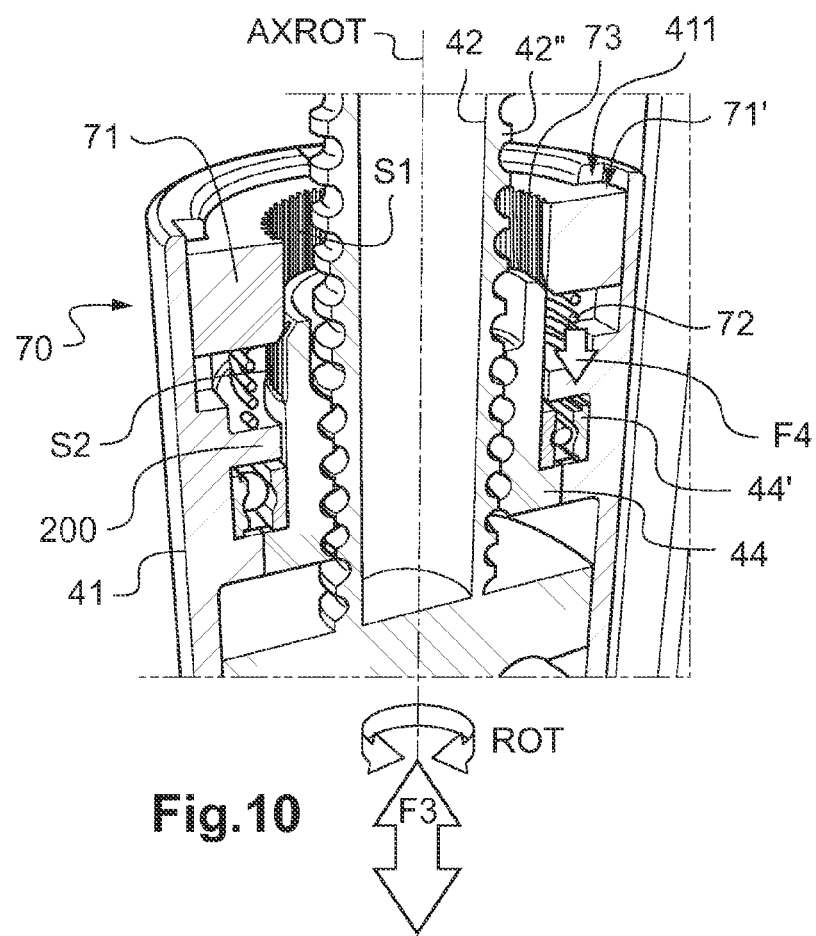

With reference to FIG. 5, the indexing means 60 comprises a hollow casing 61 secured to the bucket 10. The casing surrounds an index 30 in part, and in particular it surrounds the sheath 37 for guiding movement of the index 30 in translation. The sheath 37 may include a through oblong orifice having a stud 34 of the index 30 passing therethrough. Likewise, the casing 61 may include a slot 62 having an inclined slope through which the stud 34 passes.

Under such circumstances, the casing 61 moving in translation in elevation along the arrow F1 causes the index to move transversely in translation along the arrow F2, with the casing exerting a force on the stud 64 so as to move it along the slot 62.

With reference to FIG. 4, the movable assembly of the suspension system 40 is also provided with a rod 42 secured to the bucket. The rod 42 is connected to the indexing means 60, and for example it is connected to the casing 61 in the embodiment of FIG. 4.

The stationary assembly of the suspension means in a first alternative comprises a cylindrical body 41 extending in elevation and suspended from the energy absorber system 20. For example, the cylindrical body is fastened to the sheath 37 via a mechanical connection 41'.

The cylindrical body is said to be "stationary" insofar as this body does not perform any movement so long as the energy absorber system is not stressed.

The cylindrical body 41 has the rod 42 of the movable assembly passing therethrough. Under such circumstances, the spring member 50 is arranged inside the cylindrical body 41. More precisely, the spring member is interposed against a stop 43 of the cylindrical body and a shoulder 42' of the rod 42.

The rod 42 may also include a threaded portion 42", e.g. above its shoulder 42'. Consequently, and with reference to FIG. 10, the suspension system 40 may include a nut 44 arranged in the cylindrical body 41 and engaged on the threaded portion 42".

Rolling bearing means 44' may be arranged between the nut and the cylindrical body 41. In addition, the cylindrical body may include blocking means for preventing the nut moving in elevation along the rod 42. Consequently, the nut 44 possesses only one degree of freedom to move in rotation about the axis of rotation AX.

A movement of the bucket then causes the rod 42 to move along double-headed arrow F3, thereby causing the nut 44 to rotate ROT.

Consequently, the inhibitor system 70 may be a system operating by inertia.

The inhibitor system 70 thus includes a blocking ring 71 arranged in the cylindrical body 41 above the nut 44. This ring 71 has radial projections 71' sliding in grooves 411 extending in elevation in the cylindrical body 41. Thus, the ring 71 possesses a single degree of freedom to move in an elevation direction. The radial projections constitute movement-prevention means that prevent the blocking ring 71 from moving in rotation about the axis of rotation AXROT of the nut 44.

Furthermore, the blocking ring 71 has an inside surface S1 provided with first splines 73 in elevation. Likewise, the nut 44 is provided with an outside surface S2 suitable for facing the first surface S1, this outside surface S2 being provided with second splines 74 in elevation.

Finally, a spring 72 is interposed between an internal shoulder 200 of the cylindrical body 41 and the blocking ring 71. This spring tends to urge the ring 71 away from the nut 44. In contrast, during a crash, this spring no longer prevents the ring from surrounding the nut 44 by moving in translation in elevation along arrow F4. The first splines 73 then engage with the second splines. The nut is then prevented from moving in rotation by the ring 71. This inhibits the spring member 50 and the movable assembly becomes secured to the stationary assembly of the suspension system.

FIGS. 6 to 9 explain the operation of the first variant of an index, of the first version of indexing means, and of the first alternative embodiment of a suspension system.

With reference to FIG. 6, and in the absence of a passenger, the seat is at rest. The index 30 might possibly not be engaged with any absorber.

With reference to FIG. 7, when a passenger sits on the bucket, the movable assembly moves in translation in elevation towards the floor. The rod 42 and the casing 61 secured to the bucket thus move in elevation along arrow F5. Conversely, the cylindrical body 41 and the sheath 37 remain stationary, being connected to the energy absorber system 20.

Under drive from the rod 41, the nut 44 performs a rotary movement ROT tending to damp the movement of the bucket.

The index 30 also moves transversely in translation to engage one or more absorbers under drive from the indexing means 60.

With reference to FIG. 8, during a crash, the blocking ring 71 moves along arrow F6 and prevents the nut 44 from moving. The movable assembly then becomes secured to the stationary assembly.

With reference to FIG. 9, the crash causes the bucket 10 to move. The bucket exerts a force on the rod 42 and the casing 61. This force is transmitted to the energy absorber system 20 via the cylindrical body 41, the sheath 37, and then the index 30. As a result of the fusible members breaking, the index 30 stresses the absorbers 21 in which it is engaged.

FIGS. 11 to 16 are views explaining an embodiment of the invention combining a second variant of an index, a second version of indexing means, and a second alternative embodiment of a suspension system.

Figure 12:
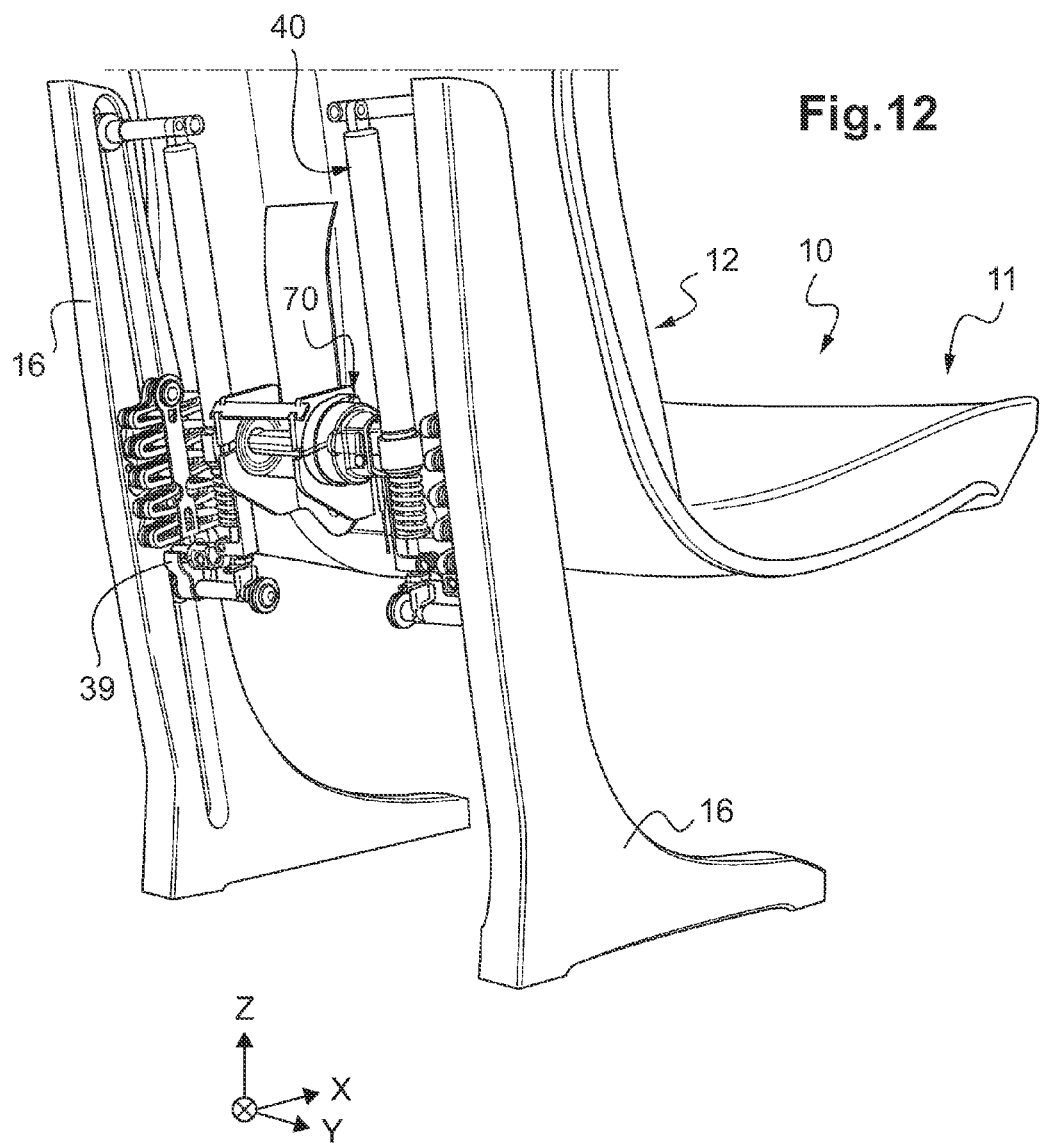

More precisely, FIG. 12 is a three-dimensional view and FIG. 11 shows the seat from behind.

Figure 15:
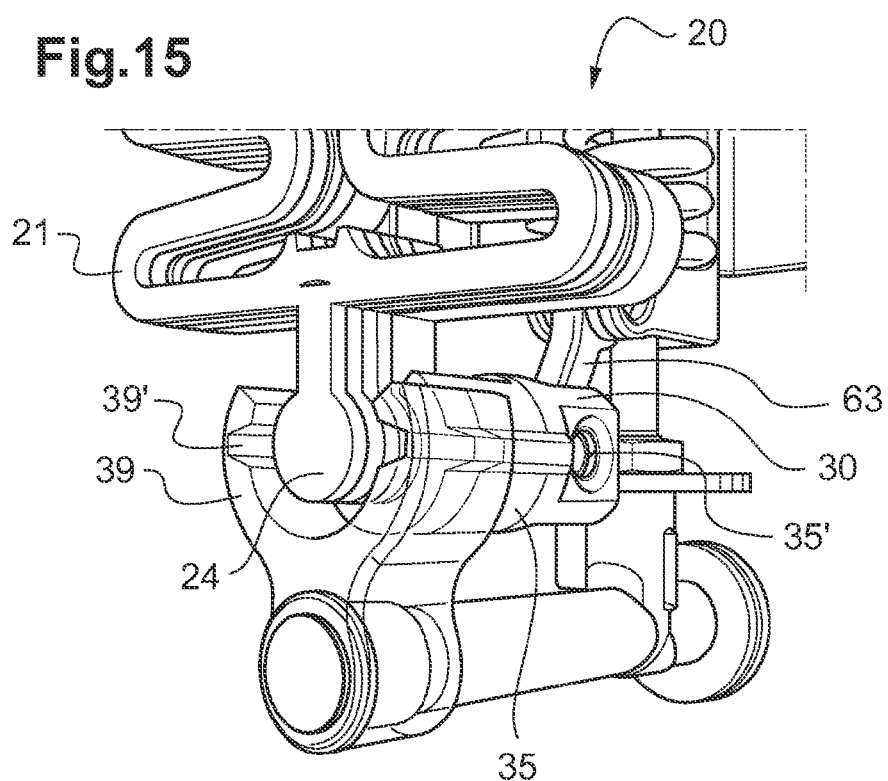
Figure 16:
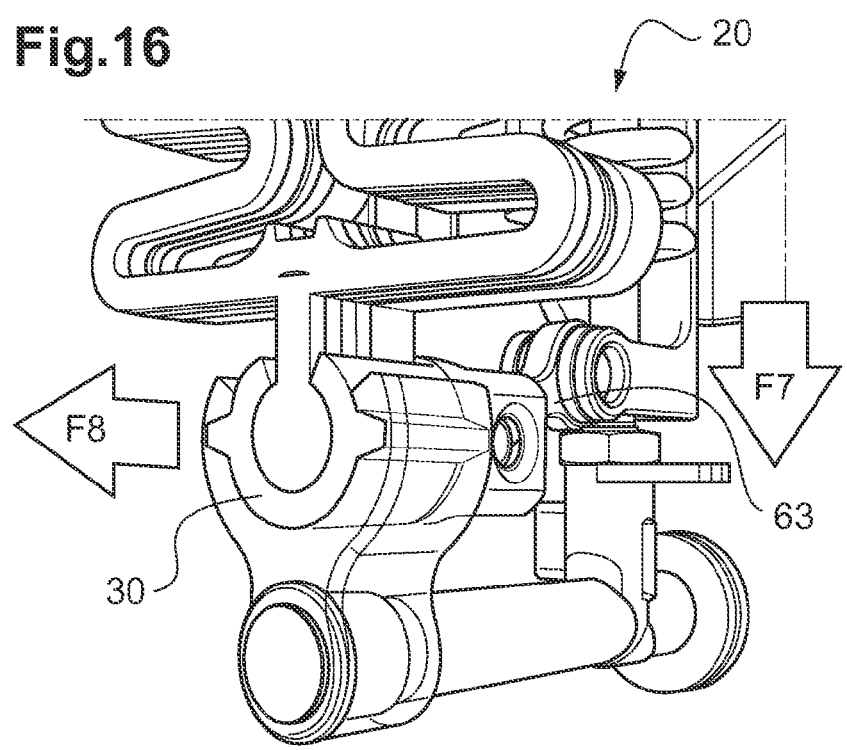

With reference to FIG. 15, a second variant of an index comprises at least one hollow cylinder 35. The hollow cylinder has a C-shaped section to make it possible for the second end 24 of the absorbers to pass therethrough. The hollow cylinder 35 can slide transversely to surround one or more absorbers, or indeed one or more fusible members.

In addition, the seat has guide means 39 for guiding the index. The guide means 39 may have a C-shaped section in order to allow the index to pass therethrough. The guide means may also possess at least one transverse groove 39' co-operating with a transverse projection 35' of the index.

The suspension system also includes a "stationary" assembly that is connected to the energy absorber system, and a "movable" assembly that is connected to the bucket 10.

The seat may thus have a second version of indexing means 60. With reference to FIG. 11, the indexing means 60 comprise a link 63 secured to the bucket 10. The link is hinged to the movable assembly of the suspension system and to an index 30. Under such circumstances, and with reference to FIG. 16, a movement of the movable assembly in translation in elevation along the arrow F7 causes the index to move in translation transversely along the arrow F8.

With reference to FIG. 11, the movable assembly of the suspension system 40 has a movable body 46 of an actuator 45. The movable body 46 is thus fastened to the bucket by a pin 300. It should be observed that this pin 300 may lead to a guide rail in a leg.

The stationary assembly of the suspension means in a second alternative then includes a stationary body 47 of an actuator 45. This stationary body is connected to the energy absorber system 20 by an angle connection 48 and the guide means 39.

The stationary body 47 may be an actuator rod extending in elevation and penetrating into the movable body 46. The actuator is then an actuator with a movable cylinder.

Under such circumstances, the spring member 50 is interposed between the movable body 46 and the stationary body 47 of the actuator 45, the spring member 50 being interposed between the movable body 46 and a shoulder of the stationary body, for example.

The actuator is advantageously an actuator that can be inhibited by operating a control switch.

Under such circumstances, the inhibitor system 70 may include a harness winder 75 and a control cable 82 for controlling the actuator 45.

Figure 13:
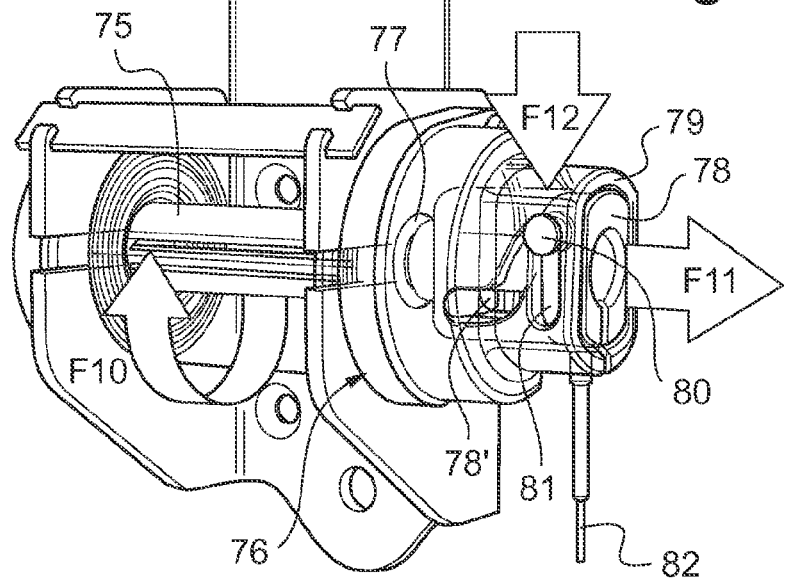

With reference to FIG. 13, a cam 76 is interposed between the winder 75 and the cable 82. This cam 76 may include a threaded shaft 77 engaged with a guide 78 that is prevented from moving in rotation by a stationary blocking member 79. The blocking member 79 also includes a slot 81 in elevation in which there slides an actuator 80 connected to the cable 82. The actuator 80 also passes through a guide slot 78' in the guide 78.

Figure 14:
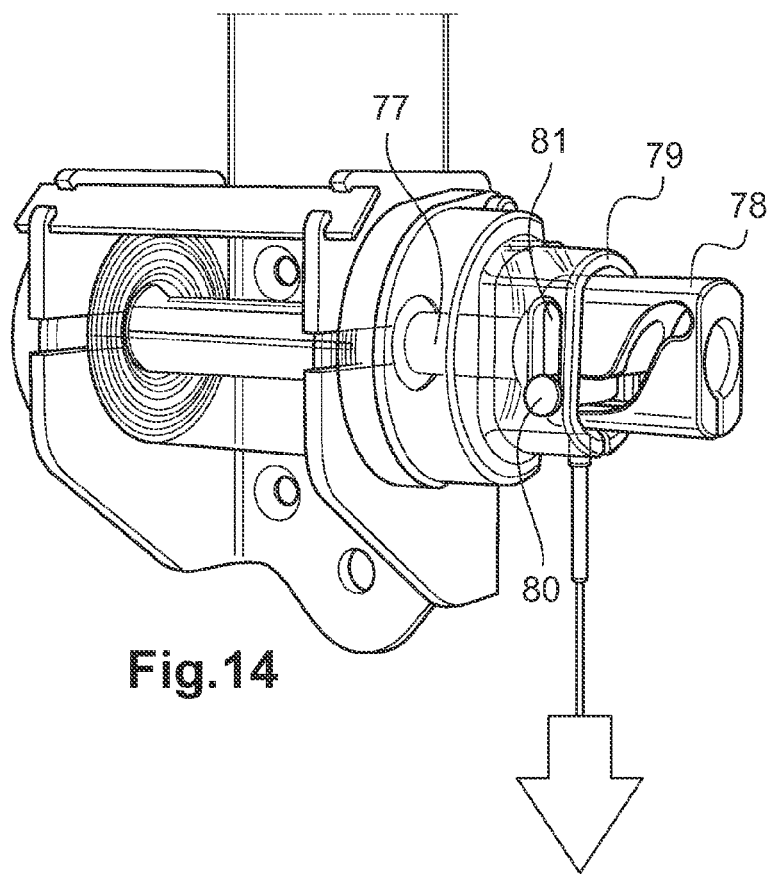

Consequently, rotation of the winder as shown by arrow F10 causes the guide 78 to move in translation. With reference to FIG. 14, the guide then causes the actuator 80 to move in translation along the slot 81.

Consequently, in the absence of a passenger, the seat is at rest. The index 30 might optionally not be engaged with any absorber.

With reference to FIG. 11, when a passenger sits on the bucket, each movable body 46 moves in translation in elevation, stressing the spring member 50. Each movable body then moves an index 30 so that it engages automatically and mechanically with the required number of absorbers.

The passenger then acts on the winder 75 to put on a harness. This action blocks each actuator 45.

In the event of a crash, the bucket 10 moves. The bucket exerts a force on each actuator 45. This force is transmitted to each energy absorber system 20 via a movable body 46, a stationary body 47, an angle connection 48, guide means 39, and an index 30.

Naturally, the present invention may be subjected to numerous variations as to its implementation. Although several embodiments are described, it will readily be understood that it is not possible to identify exhaustively all possible embodiments. It is naturally possible to envisage replacing any of the means described by equivalent means without going beyond the ambit of the present invention.

It is thus possible to combine the variants, versions, and alternatives described above in other ways in order to obtain other types of seat. For example, it is possible to arrange the indexing means of FIG. 4 on the seat of FIG. 11.

What is claimed is:

1. An aircraft seat comprising a bucket and a frame fastened to a floor to carry the bucket, the seat including an energy absorber system, and wherein:
   the energy absorber system is provided with a plurality of energy absorbers arranged in parallel, each energy absorber having a first end secured to the frame;
   the seat including an index that is movable in translation to secure the bucket to the energy absorber system by engaging a second end of one or more energy absorbers of the energy absorber system; and
   the seat includes a suspension system having a spring member suspending the bucket from the frame as a function of the weight of a passenger, the suspension system including mechanical indexing means co-operating with the index so that a translation in elevation movement of the suspension system relative to the frame under the action of the weight of at least one passenger sitting on the bucket automatically causes a transverse movement in translation of the index in order to engage the number of energy absorbers that corresponds to the weight, the seat including a mechanical inhibitor system for blocking the suspension system in the event of a crash.

2. A seat according to claim 1, wherein the energy absorber system includes at least one fusible member secured to the frame and capable of being secured to the index.

3. A seat according to claim 1, wherein the index comprises at least one cylinder penetrating into respective orifices of the absorbers.

4. A seat according to claim 1, wherein the index comprises a hollow cylinder sliding around respective ends of the absorbers.

5. A seat according to claim 1, wherein the seat includes guide means for guiding the index to move in translation.

6. A seat according to claim 1, wherein the seat includes a sheath in which a head of the index is slidably mounted, at least one spring being interposed between the head and the sheath.

7. A seat according to claim 1, wherein the index comprises a first finger co-operating with the absorbers of the energy absorber system and a second finger co-operating with a fusible member of the energy absorber system.

8. A seat according to claim 1, wherein the mechanical indexing means comprise a hollow casing provided with a slot presenting an inclined slope, the index having a stud slidable in the slot so that movement in translation in elevation of the suspension system causes the stud to slide along the slot, causing the index to move transversely in translation.

9. A seat according to claim 1, wherein the mechanical indexing means comprise a link hinged to the index and to a movable body of the suspension system.

10. A seat according to claim 1, wherein the suspension system comprises an actuator having a movable body and a stationary body, the movable body being secured to the bucket and the stationary body being attached to the energy absorber system, the spring member being interposed between the movable body and the stationary body.

11. A seat according to claim 10, wherein an inhibitor system is provided with a harness winder and a control cable for the actuator, a cam being interposed between the winder and the cable so that rotation of the winder causes the cable to move in translation and inhibit the actuator.

12. A seat according to claim 1, wherein the suspension system comprises a cylindrical body attached to the energy absorber system and a rod secured to the bucket and projecting from the cylindrical body, together with a spring member, the spring member being interposed between a stop of the cylindrical body and a shoulder of the rod.

13. A seat according to claim 12, wherein the rod has a threaded portion, and the suspension system includes a nut arranged in the cylindrical body and engaged on the threaded portion.

14. A seat according to claim 13, wherein an inhibitor system is provided with a blocking ring arranged in the cylindrical body vertically in register with the nut, the cylindrical body including movement prevention means for preventing the blocking ring from moving in rotation about an axis of rotation (AXROT) of the nut, the blocking ring having an inside surface (S1) provided with first splines extending in elevation and the nut having an outside surface (S2) provided with second splines extending in elevation, a spring being interposed between an internal shoulder of the cylindrical body and the blocking ring to separate the first and second splines other than during crash conditions, and to allow the first splines to engage with the second splines during a crash.

15. A seat according to claim 1, wherein the frame comprises first and second legs, with the energy absorber system, the movable index, and the suspension system being associated with the first leg, and the seat further comprising a second energy absorber system, a second movable index, and a second suspension system associated with the second leg.

16. An aircraft, wherein the aircraft includes the seat according to claim 1.

* * * * *